United States Patent
Goto et al.

(10) Patent No.: US 11,524,724 B2
(45) Date of Patent: Dec. 13, 2022

(54) REAR VEHICLE-BODY STRUCTURE OF VEHICLE

(71) Applicant: MAZDA MOTOR CORPORATION, Hiroshima (JP)

(72) Inventors: Hidetaka Goto, Aki-gun (JP); Koutaro Takada, Aki-gun (JP); Takuya Kubo, Aki-gun (JP); Kentaro Nomura, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 16 days.

(21) Appl. No.: 17/116,793

(22) Filed: Dec. 9, 2020

(65) Prior Publication Data
US 2021/0229752 A1 Jul. 29, 2021

(30) Foreign Application Priority Data

Jan. 29, 2020 (JP) .............................. JP2020-012690

(51) Int. Cl.
*B62D 25/08* (2006.01)
*B62D 27/02* (2006.01)
*B62D 25/04* (2006.01)

(52) U.S. Cl.
CPC .......... *B62D 25/087* (2013.01); *B62D 25/04* (2013.01); *B62D 25/088* (2013.01); *B62D 27/02* (2013.01); *B62D 27/023* (2013.01)

(58) Field of Classification Search
CPC ........ B62D 25/02; B62D 25/04; B62D 25/08; B62D 25/087; B62D 25/088; B62D 23/00; B62D 23/005; B62D 27/02; B62D 27/023

(Continued)

(56) References Cited

U.S. PATENT DOCUMENTS

2003/0111868 A1* 6/2003 Takahashi ............ B62D 25/087 296/203.04
2013/0169006 A1* 7/2013 Sera ...................... B62D 25/08 296/203.04

(Continued)

FOREIGN PATENT DOCUMENTS

JP 2008087510 A 4/2008
JP 2009067229 A * 4/2009

(Continued)

OTHER PUBLICATIONS

Kawai et al., "Rear Body Structure for Automobile", Oct. 20, 2011, Japanese Patent Office, Edition: JP2011207421A (Year: 2011).*

(Continued)

*Primary Examiner* — Dennis H Pedder
*Assistant Examiner* — Joyce Eileen Hill
(74) *Attorney, Agent, or Firm* — Studebaker & Brackett PC

(57) ABSTRACT

A rear vehicle-body structure for suppressing deformation of a corner portion of a lift gate opening is provided, including a pair of left and right inner wheel wells having damper supports; and a framework member on a rear side of the inner wheel wells forming an opening edge of a back door opening. The framework member includes a header extending in a vehicle width direction forming an upper end edge of the back door opening; and pillars extending from the header to a vehicle lower side via corner portions of the back door opening. A pair of gussets connect rear portions of the inner wheel wells and the pillars to each other; a pair of connecting members connect the rear portions of the inner wheel wells and places near the corner portions to each other; and the gussets and the connecting members are joined at places near the damper supports.

11 Claims, 8 Drawing Sheets

(58) Field of Classification Search
USPC ........ 296/9.08, 29, 30, 193.02, 198, 203.01, 296/203.03, 203.04, 203.06, 203.08
See application file for complete search history.

(56) References Cited

U.S. PATENT DOCUMENTS

2016/0221610 A1* 8/2016 Nishimura ............. B62D 25/04
2018/0273110 A1* 9/2018 Masuda ............... B62D 25/088

FOREIGN PATENT DOCUMENTS

| JP | 2011207421 A | * | 10/2011 | | |
|----|--------------|---|---------|---|---|
| JP | 2016196203 A | * | 11/2016 | ............. | B62D 25/08 |
| JP | 2019151287 A | * | 9/2019 | ............. | B62D 25/00 |

OTHER PUBLICATIONS

Matsuoka et al., "Vehicle Body Rear Part Structure", Feb. 4, 2009, Japanese Patent Office, Edition: JP2009067229A (Year: 2009).*
Mitsui, "Vehicle Rear Part Structure", Nov. 24, 2016, Japanese Patent Office, Edition: JP2016196203A (Year: 2016).*
Akihiro, "Vehicle Body Structure of Vehicle", Sep. 12, 2019, Japanese Patent Office, Edition: JP2019151287A (Year: 2019).*
Atsushi, "Vehicular Rear Part Structure", Nov. 24, 2016, Japanese Patent Office, Edition: JP2016196203A (Year: 2016).*

* cited by examiner

REAR VEHICLE-BODY STRUCTURE OF VEHICLE

TECHNICAL FIELD

The present disclosure relates to a rear vehicle-body structure of a vehicle that improves the rigidity of an opening edge; for example, of a lift gate opening.

BACKGROUND ART

Various technologies have been known that improve the rigidity of an opening edge of a lift gate opening that is opened by an openable and closable back door in an automobile in which the lift gate opening is formed to suppress the deformation thereof.

For example, Japanese Patent Laid-Open No. 2008-087510 discloses a structure in which a back end portion of a gusset member formed so as to expand toward the rear side is joined to a rear pillar that is a framework member that forms an opening edge of a lift gate opening, to thereby connect a portion of the rear pillar that extends across a predetermined length and a rear wheel well to each other via the gusset member.

In the structure disclosed in Japanese Patent Laid-Open No. 2008-087510, the rear pillar and the rear wheel well can be reinforced, and hence the deformation of the rear pillar that is a framework member that forms the opening edge of the lift gate opening can be suppressed.

However, in a vehicle of which convenience is improved by securing the capacity of a trunk on the vehicle rear side, for example, a structure in which the rear wheel well and the lift gate opening are spaced apart from each other in the front-rear direction is provided, and hence the gusset member is long in the front-rear direction. Therefore, the gusset member that connects the rear pillar and the rear wheel well to each other is also long, and there is a fear that the rigidity of the gusset member may become insufficient and a distorted deformation may be caused in a corner portion and the like of the lift gate opening.

SUMMARY

In view of the abovementioned problem, the present disclosure provides a rear vehicle-body structure of a vehicle capable of suppressing a distorted deformation of a corner portion and the like of a lift gate opening.

The present disclosure provides a rear vehicle-body structure including a pair of left and right rear wheel wells to which upper ends of suspension dampers are mounted; and a framework member that is disposed on a vehicle rear side of the rear wheel wells and forms an opening edge of a lift gate opening. The rear vehicle-body structure is characterized in that the framework member includes: a rear header that extends in a vehicle width direction and forms an upper end edge of the lift gate opening; and rear pillars that extend from the rear header to a vehicle lower side via corner portions positioned on an upper side of the lift gate opening. The rear vehicle-body structure includes: a pair of left and right gusset members that connect rear-side portions of the rear wheel wells and the rear pillars to each other; and a pair of left and right connecting members that connect the rear-side portions of the rear wheel wells and places near the corner portions to each other. The gusset members and the connecting members are connected to each other at places near damper tops to which the upper ends of the suspension dampers are mounted.

According to the present disclosure, the connecting member, the gusset member, and the rear pillar form a triangular shape, and hence the connecting member, the gusset member, and the rear pillar suppress the displacement of the damper top input from the road surface via a rear suspension damper. As a result, the distorted deformation of the corner portion and the like of the lift gate opening can be suppressed.

By a section at which the connecting member and the gusset member forming the triangular shape are coupled to each other, the damper top can be supported, and hence the rigidity of the damper top can be improved. Therefore, the displacement of the damper top caused by the up-down direction load input from the road surface via the rear suspension damper can be further suppressed.

Therefore, a case where the displacement of the damper top is transmitted to the rear side as a large displacement can be suppressed, and the distorted deformation of the corner portion of the lift gate opening can be suppressed more. Therefore, the ride comfort and the steering stability of an occupant can be secured.

As an aspect of the present disclosure, the connecting members may each include a flat surface portion facing in the vehicle width direction from a damper-top-side end portion fixed to each of the damper tops to a rear-header-side end portion fixed to the rear header, and the flat surface portion may be fixed to one surface of each rear pillar facing in the vehicle width direction and one surface near the damper top.

The expression of "facing in the vehicle width direction" described above does not only mean a case where the vehicle width direction matches with a perpendicular line direction orthogonal to the flat surface portion, and may be a direction in which the vehicle width direction intersects with the vertical direction at an angle less than 45 degrees.

According to the present disclosure, the connecting member can connect the rear-side portion of the rear wheel well and the rear pillar to each other in a state in which the flat surface portion faces in the vehicle width direction without being twisted or curved. Therefore, the connecting member can reliably transmit the up-down direction load input from the road surface via the rear suspension damper as compressive force in the axial force direction and reliably maintain the triangular shape formed with the gusset member and the rear pillar.

As an aspect of the present disclosure, the connecting members may each have a bead that extends in a longitudinal direction provided thereon. The bead may be provided such that one bead is provided in the longitudinal direction of the connecting member from the base end side to the distal end side, or a plurality of beads may be disposed in the longitudinal direction of the connecting member in a continuous manner.

According to the present disclosure, the rigidity of the connecting member can be improved without increasing the mass of the connecting member, and hence the up-down direction load input from the road surface via the rear suspension damper can be transmitted by the connecting member in a more reliable manner Therefore, the distorted deformation of the corner portion and the like of the lift gate opening can be suppressed in a more reliable manner.

As an aspect of the present disclosure, the connecting members may be fastened to the gusset members and the places near the corner portions. According to the present disclosure, the connecting member can be mounted on the rear pillar and the gusset member later, and the connecting member can be fixed to the rear pillar and the gusset member without hindering the operation of mounting equipment to be mounted on the outer side of the connecting member in the vehicle width direction. There is no need to form a hole in the vehicle body in accordance with the fixing of the connecting member, and hence a water stop member does not necessarily need to be provided.

According to the present disclosure, the rear vehicle-body structure of the vehicle capable of suppressing the distorted deformation of the corner portion and the like of the lift gate opening can be provided.

DETAILED DESCRIPTION

An embodiment of the present disclosure is described in detail with reference to the drawings below. A vehicle 1 of this embodiment is a so-called hatchback vehicle in which a trunk is provided on the vehicle rear side of a vehicle cabin that is boarded and alighted from by an occupant and the vehicle rear side of the trunk is covered with a back door (also referred to as a lift gate) in an openable and closable manner A vehicle-body structure of the vehicle 1 as above is described with reference to FIG. 1 to FIG. 8B.

Figure 1:
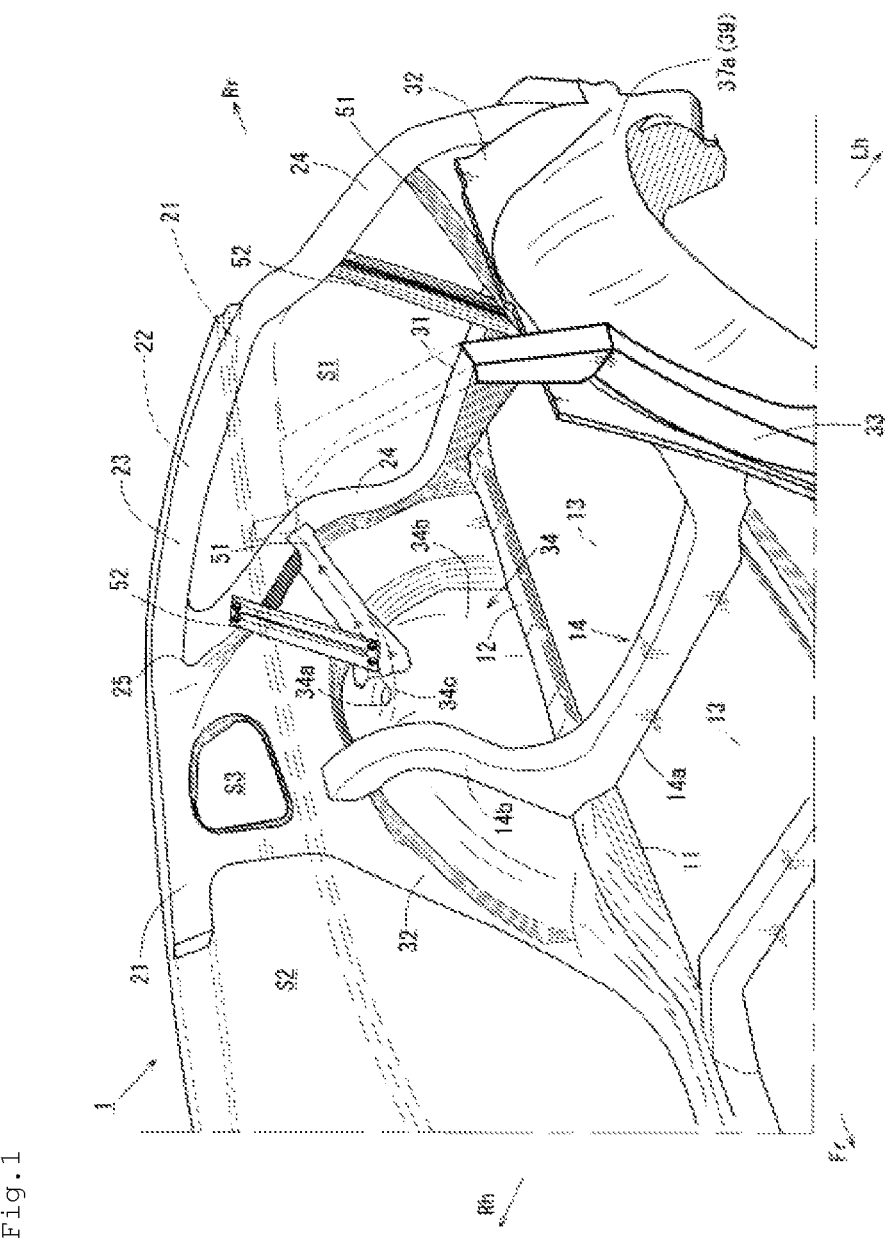
FIG. 1 is a perspective view of a vehicle-body structure of a rear portion of a vehicle of an embodiment of the present disclosure seen from the front side.
Figure 2:
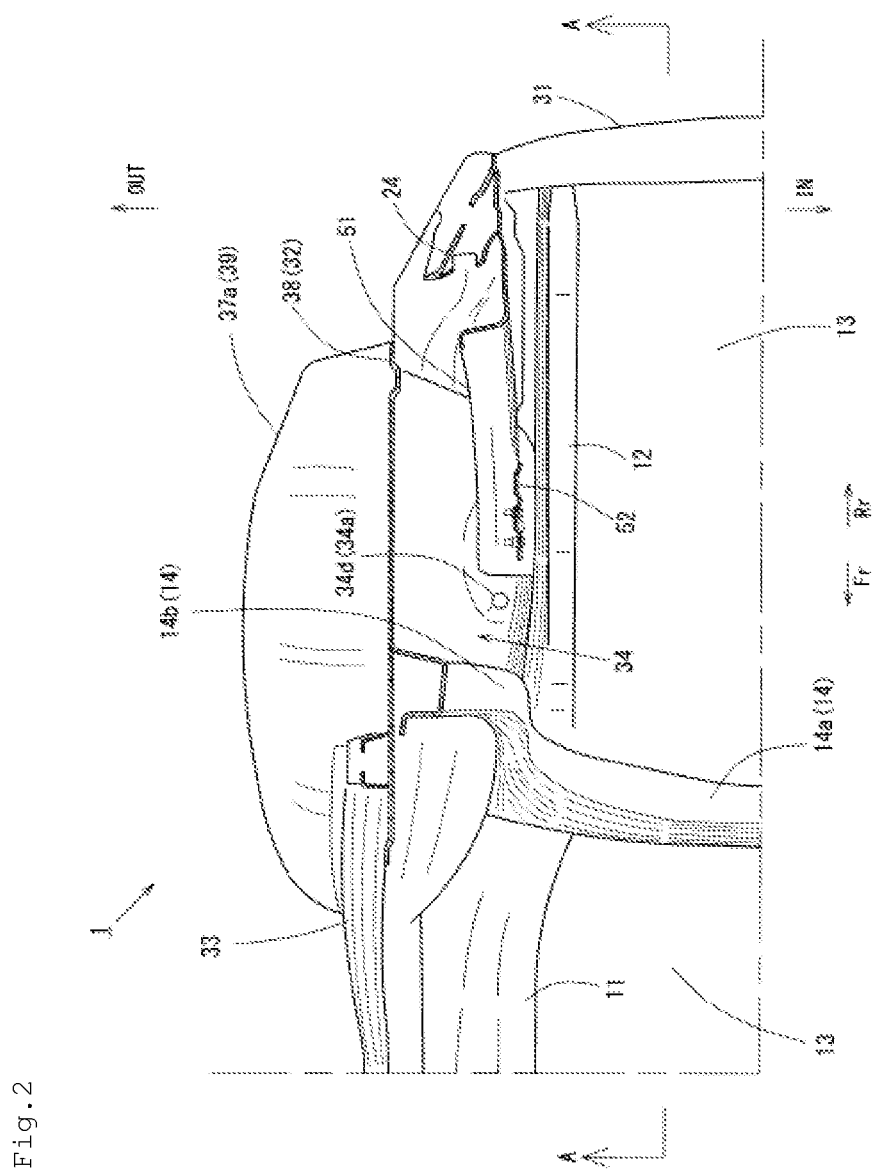
FIG. 2 is a cross-sectional plan view of the rear portion of the vehicle of this embodiment.
Figure 3:
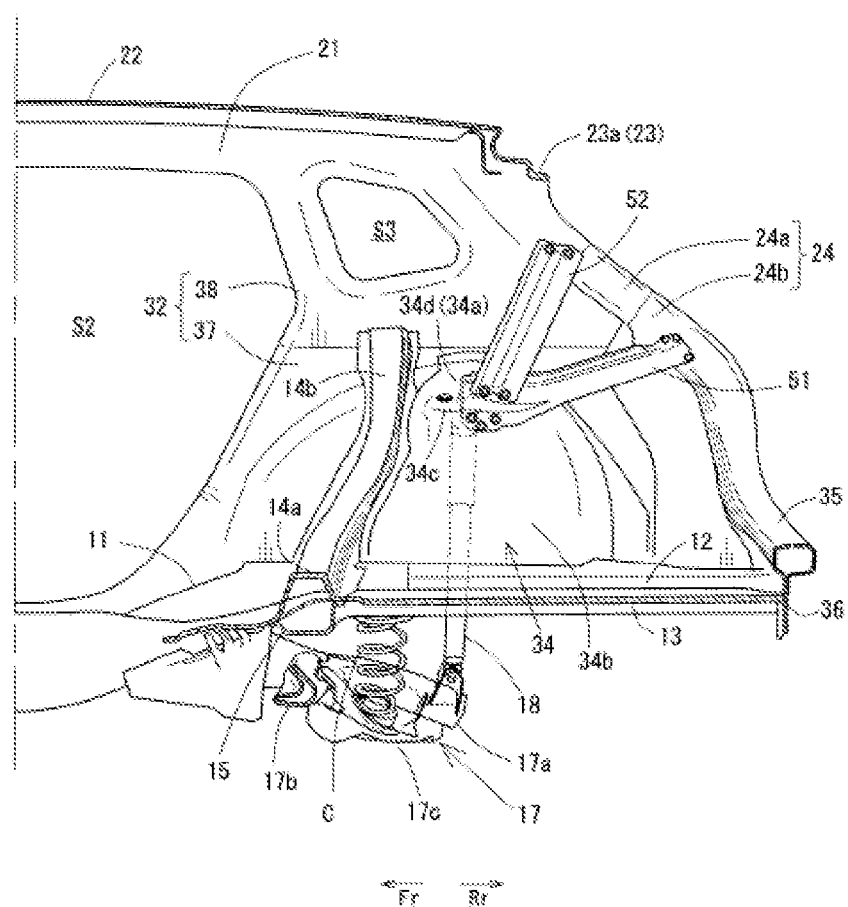
FIG. 3 is a side view illustrating the main part of the vehicle-body structure of the rear portion of the vehicle of this embodiment from the inner side.

FIG. 1 illustrates a perspective view of a rear portion of the vehicle 1 seen from the front side, FIG. 2 illustrates a cross-sectional plan view of the rear portion of the vehicle 1 that is cut at a substantially central portion in the height direction seen from the upper side, and FIG. 3 illustrates a side view of the rear portion of the vehicle 1 seen from the vehicle-width-direction inner side that is an arrow cross-sectional view taken along line A-A in FIG. 2.

Figure 4:
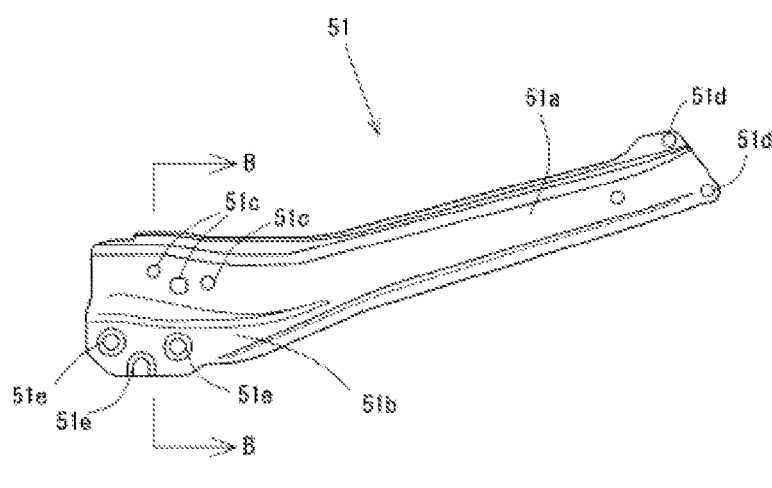
FIG. 4 is a front view of a gusset member.
Figure 5:
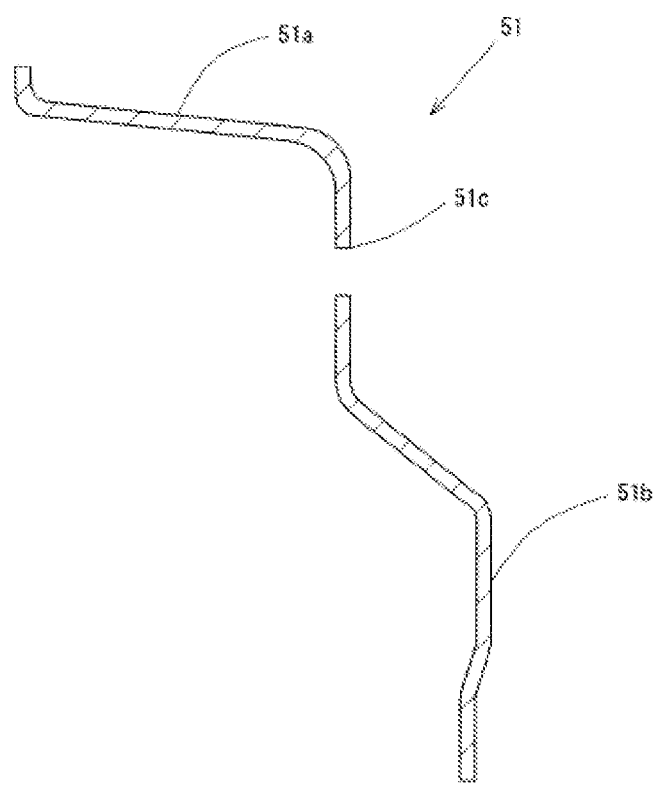
FIG. 5 is a cross-sectional view taken along line B-B in FIG. 4.
Figure 6:
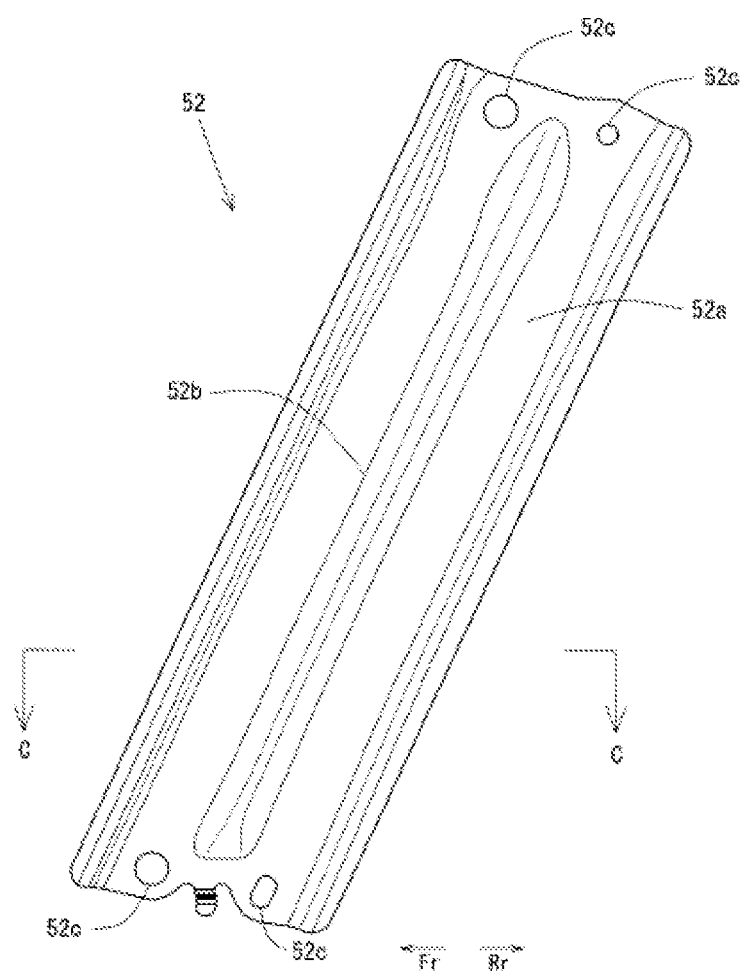
FIG. 6 is a front view of a connecting member.
Figure 7:
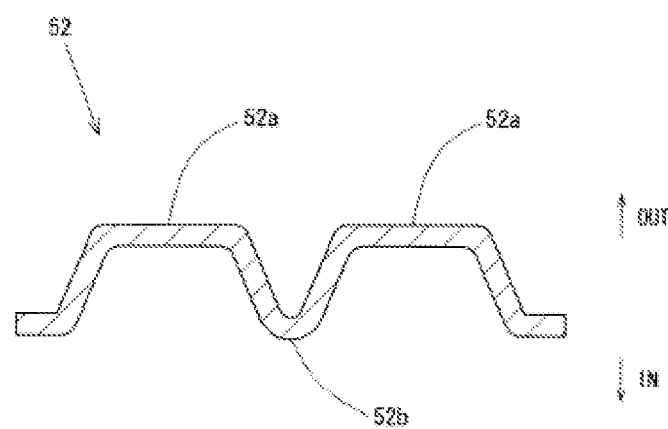
FIG. 7 is a cross-sectional view taken along line C-C in FIG. 6.
Figure 8A:
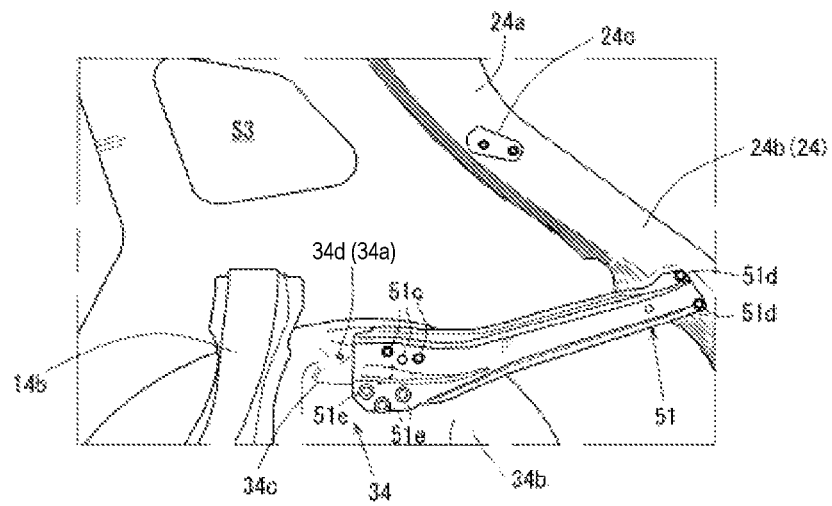
FIGS. 8A and 8B are explanatory views of the mounting of the connecting member.
Figure 8B:
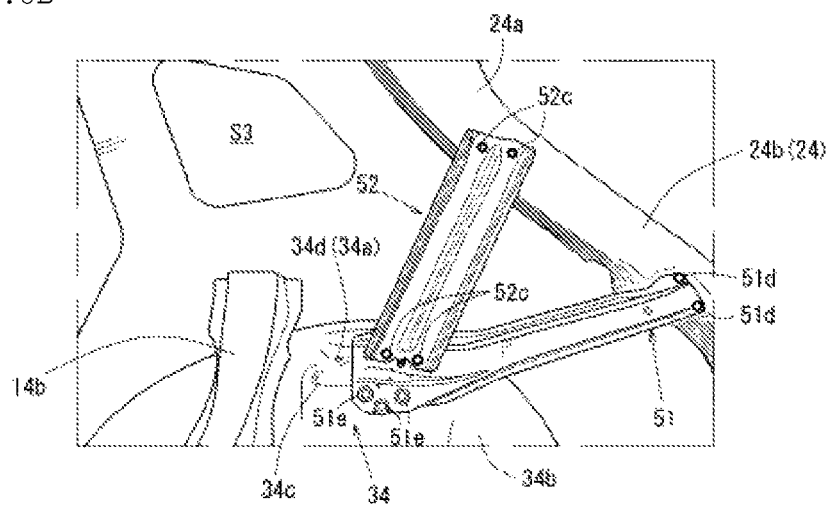

FIG. 4 illustrates a front view of a gusset member 51 seen from the vehicle-width-direction inner side, FIG. 5 illustrates an arrow cross-sectional view taken along line B-B in FIG. 4, FIG. 6 illustrates a front view of a connecting member 52 seen from the vehicle-width-direction inner side, FIG. 7 illustrates an arrow cross-sectional view taken along line C-C in FIG. 6, and FIGS. 8A and 8B illustrate explanatory views of the mounting of the connecting member. The vehicle-body structure of the rear portion of the vehicle 1 of this embodiment is bilaterally symmetrical, and hence only the vehicle body right side is illustrated in FIG. 2, FIG. 3, and FIGS. 8A-8B.

In the drawings, arrows Fr and Rr indicate the front-rear direction, arrow Fr indicates the front side, and arrow Rr indicates the rear side. Arrows Rh and Lh indicate the width direction, arrow Rh indicates the right direction, and arrow Lh indicates the left direction. Arrow IN indicates the vehicle-width-direction inner side, and arrow OUT indicates the vehicle-width-direction outer side.

As illustrated in FIG. 1, the vehicle 1 of this embodiment includes a pair of left and right side sills 11 that extend in the vehicle front-rear direction at positions spaced apart from each other at a predetermined interval in the vehicle width direction, a pair of left and right rear side frames 12 that are connected to back ends of the side sills 11 and extend to the vehicle rear side, a floor panel 13 that forms a floor of the vehicle 1 between the pair of left and right side sills 11 and the pair of left and right rear side frames 12, and a first floor cross member 14 that connects the pair of left and right rear side frames 12 to each other in the vehicle width direction.

As illustrated in FIG. 1 and FIG. 3, on the vehicle upper side with respect to the pair of left and right side sills 11, the vehicle 1 includes a pair of left and right roof side rails 21 that extend in the vehicle front-rear direction at positions spaced apart from each other at a predetermined interval in the vehicle width direction, a roof panel 22 that connects the pair of left and right roof side rails 21 to each other in the vehicle width direction, a roof reinforcement (not shown), a rear header 23, and a pair of left and right rear pillars 24 that extend to the vehicle rear side and lower side from back ends of the roof side rails 21.

As illustrated in FIG. 1, the vehicle 1 includes a rear end 31 that connects the pair of left and right rear pillars 24 to each other in the vehicle width direction and forms a rear wall of the trunk, a pair of left and right rear side panels 32 that form side walls of the vehicle 1, a pair of left and right side pillars 33 that connect rear portions of the side sills 11 and the roof side rails 21 to each other, and a pair of left and right wheel well inner portions 34 that cover rear wheels (not shown) of the vehicle 1 on the vehicle front side with respect to the rear end 31.

An opening surrounded by the rear header 23, the pair of left and right rear pillars 24, and the rear end 31 is a back door opening S1 covered by the back door in an openable and closeable manner. An opening surrounded by the side sill 11, the roof side rail 21, the side pillar 33, and a hinge pillar (not shown) that connects the side sill 11 and the roof side rail 21 to each other on the front side of the vehicle 1 is a side door opening S2, which is covered by a side door in an openable and closeable manner and through which the occupant performs the boarding and the alighting.

As illustrated in FIG. 1, the pair of left and right side sills 11 are members forming a vehicle body framework of a vehicle lower portion, and are each formed in a shape which has a length in the vehicle front-rear direction and of which back end is positioned on the vehicle front side with respect to the first floor cross member 14 and front end is positioned on a front end of the vehicle cabin.

The side sill 11 forms a closed cross-section that extends in the vehicle front-rear direction and joins a side sill inner portion (not shown) positioned on the vehicle-width-direction inner side and a side sill outer portion (not shown) positioned on the vehicle-width-direction outer side to each other in the vehicle width direction.

As illustrated in FIG. 1, the pair of left and right rear side frames 12 are members forming the vehicle body framework of the vehicle lower portion and have front ends joined to the back ends of the side sills 11 via the first floor cross member 14 and back ends joined to the rear end 31. The rear side frame 12 includes a side frame lower portion (not shown), which is positioned on the vehicle lower side and of which cross-sectional shape in a vertical cross-section along the vehicle width direction is a cross-section having a substantially hat-shaped profile that protrudes to the vehicle lower side, and a side frame upper portion (not shown), which is positioned on the vehicle upper side and of which cross-section is substantially plate-shaped. By joining the side frame lower portion and the side frame upper portion to each other in the vehicle up-down direction, the rear side frame 12 forms a closed cross-section that extends in the vehicle front-rear direction.

As illustrated in FIG. 1 to FIG. 3, the floor panel 13 is a panel member forming the floor of the vehicle 1 between the pair of left and right side sills 11 and the pair of left and right rear side frames 12.

As illustrated in FIG. 1 to FIG. 3, the first floor cross member 14 connects places near front ends of the pair of left and right rear side frames 12 and front end lower portions of the pair of left and right wheel well inner portions 34 described below to each other in the vehicle width direction and forms a vehicle body framework that extends in the vehicle width direction with the floor panel 13.

As illustrated in FIG. 1, the first floor cross member 14 includes a cross member 14a joined to the floor panel 13, and a pair of left and right side braces 14b that extend to the vehicle upper side and rear side from both ends of the cross member 14a in the vehicle width direction.

As illustrated in FIG. 3, the cross member 14a is formed to have a cross-section having a substantially hat-shaped profile that protrudes to the vehicle upper side in a vertical cross-section along the vehicle front-rear direction. As illustrated in FIG. 2, the side brace 14b is formed to have a cross-section having a substantially hat-shaped profile that is continuous from the cross member 14a and in a shape that extends to the vehicle upper side and rear side from the cross member 14a so as to be provided along the wheel well inner portion 34.

As illustrated in FIG. 3, on the vehicle lower side of the cross member 14a, a second floor cross member 15 that connects the pair of left and right rear side frames 12 to each other is disposed. As illustrated in FIG. 3, the second floor cross member 15 has a cross-sectional shape in a vertical cross-section along the vehicle front-rear direction that is formed to be a cross-section having a substantially hat-shaped profile that protrudes to the vehicle lower side. The second floor cross member 15 forms a closed cross-section that extends in the vehicle width direction by being joined to the first floor cross member 14 such that the floor panel 13 is interposed therebetween.

As illustrated in FIG. 3, a torsion-beam rear suspension 17 is provided on the lower side of the first floor cross member 14 and the second floor cross member 15. Specifically, as illustrated in FIG. 3, the rear suspension 17 includes a pair of left and right trailing arms 17a that are closed cross-sectional members that extend in the vehicle front-rear direction so as to be spaced apart from each other at a predetermined interval in the vehicle width direction, a cross beam 17b that connects front portions of the trailing arms 17a to each other in the vehicle width direction, and a pair of left and right spring seats 17c on which coil springs C are placed, and is suspended between bottom portions (lower surfaces of the side pillars 33) of the vehicle 1.

In the rear suspension 17 formed as above, suspension dampers 18 that extend in the up-down direction on the wheel assembly upper side are connected to the rear sides of the trailing arms 17a connected to the lower surfaces of the side pillars 33, and the suspension dampers 18 and the coil springs C buffer the impact from the road surface. In FIG. 3, an upper end portion of the suspension damper 18 that is hidden by the wheel well inner portion 34 and cannot seen is illustrated by broken lines.

Although detailed illustrations thereof are omitted, each of the pair of left and right roof side rails 21 forms a closed cross-section that extends in the vehicle front-rear direction by joining a roof side rail outer portion having a cross-sectional shape that protrudes to the vehicle-width-direction outer side, and a roof side rail inner portion positioned on the vehicle-width-direction inner side with respect to the roof side rail outer portion and having a cross-sectional shape that protrudes to the vehicle-width-direction inner side to each other in a vertical cross-section along the vehicle width direction.

The roof side rail 21 forms a vehicle body framework that extends in the vehicle front-rear direction by forming the closed cross-section that extends in the vehicle front-rear direction by the roof side rail outer portion and the roof side rail inner portion.

As illustrated in FIG. 1, the rear header 23 connects places near joining sections between the roof side rails 21 and the rear pillars 24 to each other in the vehicle width direction. Specifically, as illustrated in FIG. 3, the rear header 23 forms a closed cross-section that extends in the vehicle width direction by joining a rear header upper portion (not shown) having a vertical cross-sectional shape that protrudes to the vehicle upper side, and a rear header lower portion 23a positioned on the vehicle lower side with respect to the rear header upper portion and having a vertical cross-sectional shape that protrudes to the vehicle lower side to each other in a vertical cross-section along the vehicle front-rear direction.

The rear header 23 forms a vehicle body framework that extends in the vehicle front-rear direction by forming a closed cross-section that extends in the vehicle front-rear direction by the rear header upper portion and the rear header lower portion 23a.

The pair of left and right rear pillars 24 are connected to the roof side rails 21 that extend in the vehicle front-rear direction. In other words, the pair of left and right rear pillars 24 are connected to the rear header 23 that extends in the vehicle width direction via the roof side rails 21. Specifically, as illustrated in FIG. 3, the rear pillar 24 includes a rear pillar upper portion 24a that extends from a back end portion of the roof side rail 21 toward the rear side and the diagonally lower side, and a rear pillar lower portion 24b that extends toward a place on the rear side and the diagonally lower side of the rear pillar upper portion 24a.

On a surface of the rear pillar upper portion 24a that faces the vehicle-width-direction inner side, a fastening portion 24c to be fastened with the connecting member 52 described below is provided (see FIG. 8A). The fastening portion 24c is provided in a place near a place above a connecting portion between the rear pillar upper portion 24a and the roof side rail 21 and in a place near a corner portion 25 curved from a front end portion of the rear pillar upper portion 24a to the rear header 23.

The rear pillar 24 forms a closed cross-section that extends from a back end of the roof side rail 21 to the vehicle rear side and lower side so as to be continuous with the closed cross-section of the roof side rail 21 by joining the rear pillar upper portion 24a and the rear pillar lower portion 24b to each other.

As illustrated in FIG. 1 and FIG. 2, the rear end 31 includes a rear end panel 35 that is a panel member serving as the rear wall of the trunk, and a rear end cross member 36 joined to a front surface of the rear end panel 35. As illustrated in FIG. 3, the rear end panel 35 is a panel member having a thickness in the vehicle front-rear direction and is disposed on a back end of the floor panel 13 so as to be provided in a protruding manner. As illustrated in FIG. 3, the rear end cross member 36 has a vertical cross-sectional shape in a vertical cross-section along the vehicle front-rear direction that is a cross-section having a substantially hat-shaped profile that protrudes to the vehicle front side, and forms a closed cross-section that extends in the vehicle width direction so as to be continuous with the closed cross-sections of the rear pillars 24 by having both ends in the vehicle width direction that are joined to the pair of left and right rear pillars 24 and having a rear surface joined to the rear end panel 35.

The rear end 31 formed as above forms a vehicle body framework that extends in the vehicle width direction by forming the closed cross-section that extends in the vehicle width direction to be continuous with the closed cross-sections in the pair of left and right rear pillars 24 by the rear end panel 35 and the rear end cross member 36.

As illustrated in FIG. 1 and FIG. 3, the pair of left and right rear side panels 32 are panel members that cover a portion surrounded by the side sills 11, the rear side frames 12, the roof side rails 21, the rear pillars 24, the rear end 31, the wheel well inner portions 34, and the side pillars 33. A front end edge of the rear side panel 32 that is a back end edge of the side door opening S2 is formed in a shape in which an upper end is positioned in the substantially same position as a lower end in the vehicle front-rear direction in side view.

As illustrated in FIG. 3, the rear side panel 32 includes a side panel lower portion 37 to which the wheel well inner portion 34 is joined, and a side panel upper portion 38 joined to an upper end of the side panel lower portion 37. The side panel lower portion 37 forms a side wall of the trunk and forms a rear wheel well 39 that covers the rear wheel with the wheel well inner portion 34 described below. Specifically, as illustrated in FIG. 1 and FIG. 2, the side panel lower portion 37 is a panel member having a thickness in the vehicle width direction and has a wheel well outer portion 37a that is a portion that bulges out to the vehicle-width-direction outer side.

As illustrated in FIG. 1 and FIG. 3, an opening S3 opened in a substantially triangular shape in side view is formed in the side panel upper portion 38 as an opening. The opening S3 is formed as an opening on which window glass (not shown) is mounted.

As illustrated in FIG. 1 to FIG. 3, each of the pair of left and right side pillars 33 connects the rear portion of the side sill 11 and the roof side rail 21 to each other in the vehicle up-down direction along the front end edge of the rear side panel 32 that is the back end edge of the side door opening S2.

In more detail, as illustrated in FIG. 1 and FIG. 2, a horizontal cross-sectional shape of the side pillar 33 in a horizontal cross-section along the vehicle width direction is a cross-section having a substantially hat-shaped profile that protrudes to the vehicle-width-direction outer side, and the side pillar 33 has a lower end that is joined to the side sill 11 and an upper end that is joined to the roof side rail 21. The side pillar 33 has a surface on the vehicle-width-direction inner side that is joined to a surface of the rear side panel 32 on the vehicle-width-direction outer side. As a result, the side pillar 33 forms a closed cross-section that extends in the vehicle up-down direction. The side pillar 33 forms a vehicle body framework that extends in the vehicle up-down direction by forming the closed cross-section that extends in the vehicle up-down direction with the rear side panel 32.

As illustrated in FIG. 1 to FIG. 3, the pair of left and right wheel well inner portions 34 are disposed on the vehicle rear side with respect to the back end edges of the side door openings S2 and are formed to have substantially dome-like shapes that bulge out to the vehicle-width-direction inner side with respect to the rear side panel 32. Specifically, as illustrated in FIG. 1 to FIG. 3, the wheel well inner portion 34 includes an arc-shaped wheel well upper surface 34a toward the upper side, a wheel well inner surface 34b formed on the vehicle-width-direction inner side, and a ridge portion 34c on a portion at which the wheel well upper surface 34a and the wheel well inner surface 34b intersect with each other. The wheel well inner portion 34 formed as above forms the rear wheel well 39 with the wheel well outer portion 37a.

As illustrated in FIG. 1 to FIG. 3, the wheel well upper surface 34a is formed as a rear damper supporting portion 34d that supports an upper end of the suspension damper 18. In other words, the wheel well inner portion 34 functions as a rear suspension tower that supports the suspension damper 18.

In more detail, the rear damper supporting portion 34d is formed to have a higher rigidity than peripheral sections. The upper end of the suspension damper 18 inserted through an insertion hole is fastened and fixed to the rear damper supporting portion 34d having a high rigidity as above. In other words, the rear damper supporting portion 34d supports the upper end of the suspension damper 18.

As illustrated in FIG. 1 to FIG. 3, the gusset member 51 connected to the rear pillar 24 is joined to the wheel well inner portion 34, and the connecting member 52 connected to the rear pillar 24 is fastened and fixed to the wheel well inner portion 34.

As illustrated in FIG. 4 and FIG. 5, the gusset member 51 is a plate-shaped component member composed of a body 51a formed to have a substantially inverted L-shaped cross-section in vehicle front view, and a protrusion 51b having a substantially inverted L-shaped cross-section in vehicle front view that protrudes to the vehicle-width-direction inner side from the lower end side of a front-side portion in a state in which the body 51a is mounted from the front side to the rear side.

The body 51a is formed to be inclined to the upper side as the body 51a approaches the vehicle rear side in a state of being fixed to the wheel well inner portion 34. A surface of the body 51a that faces in the vehicle width direction has the substantially same width in the front-rear direction and has a front end portion in which bolt holes 51c through which fastening is possible with bolts are provided. In the back end portion of the body 51a, rear-side joining portions 51d to be coupled to the rear pillar 24 are provided on the surface that faces in the vehicle width direction.

The protrusion 51b is formed so as to be provided along the shape of the ridge portion 34c formed on the portion at which the wheel well upper surface 34a and the wheel well inner surface 34b intersect with each other, and has front-side joining portions 51e to be joined to the wheel well inner portion 34 provided on the front end side and the lower side thereof.

As illustrated in FIG. 1 to FIG. 3, in the gusset member 51 formed as above, a front end portion of the gusset member 51 is fixed to the ridge portion 34c in the wheel well inner portion 34 that bulges out to the vehicle-width-direction inner side so as to cover the ridge portion 34c from the vehicle rear side and the vehicle-width-direction inner side, and a back end portion of the gusset member 51 is fixed to the rear pillar lower portion 24b so as to cover the rear pillar lower portion 24b from the vehicle front side and the vehicle-width-direction inner side. The gusset member 51 is joined to the rear damper supporting portion 34d and can transmit the up-down-direction load from the suspension damper 18 to the rear side.

In this embodiment, the gusset member 51 is joined to, but not limited to, the rear damper supporting portion 34d that corresponds to a place to which the upper end of the suspension damper 18 is fixed. For example, the gusset member 51 may be fixed to any place near the rear damper supporting portion 34d as long as the up-down-direction load from the suspension damper 18 can be received and transmitted along the gusset member 51.

As illustrated in FIG. 1 to FIG. 3, the connecting member 52 connects the vehicle rear side of the rear damper supporting portion 34d in the wheel well inner portion 34 and an upper end of the rear pillar upper portion 24a to each other in the vehicle front-rear direction so as to be substantially parallel to the side brace 14b.

As illustrated in FIG. 6 and FIG. 7, the connecting member 52 has a flat plate structure and includes a flat surface portion 52a formed by a flat surface facing in the vehicle width direction and a bead 52b that protrudes along the vehicle-width-direction inner side in a central portion of the flat surface portion 52a and extends in the longitudinal direction in a fixed state. On four corners of the flat surface portion 52a, fastening portions 52c that can be fastened with bolts are provided. In other words, the direction orthogonal to the flat surface portion 52a of the connecting member 52 matches with the vehicle width direction.

As illustrated in FIG. 1, FIG. 3, and FIG. 8B, the connecting member 52 formed as above has a front end that is fastened and fixed to the gusset member 51 welded and fixed to the wheel well inner portion 34 and the rear header 23, and a back end that is fastened and fixed to the rear pillar upper portion 24a.

The coupling of the gusset member 51 and the connecting member 52 is described in detail with reference to FIGS. 8A and 8B. As described above, as illustrated in FIG. 8A, the gusset member 51 has a front-side portion that is welded and fixed to the ridge portion 34c so as to cover the ridge portion 34c from the vehicle rear side and the vehicle-width-direction inner side, and a rear-side portion that is disposed on the rear pillar lower portion 24b so as to cover the rear pillar lower portion 24b from the vehicle front side and the vehicle-width-direction inner side, and the rear-side joining portions 51d and the front-side joining portions 51e are welded and fixed to the rear pillar lower portion 24b and the wheel well inner portions 34, respectively. As a result, the gusset member 51 connects the wheel well inner portion 34 and the rear pillar lower portion 24b to each other.

As described above, as illustrated in FIG. 8B, a front-side portion of the connecting member 52 is disposed on the bolt holes 51c of the gusset member 51 fixed to the wheel well inner portion 34 and the rear pillar lower portion 24b such that the fastening portions 52c match with the bolt holes 51c, the connecting member 52 is disposed such that the fastening portions 52c on the rear-side portion of the connecting member 52 match with the fastening portion 24c provided on the rear pillar upper portion 24a, and the connecting member 52 is fastened to the wheel well inner portion 34 and the rear pillar upper portion 24a. As a result, the connecting member 52 is fixed to the wheel well inner portion 34 and the rear pillar upper portion 24a.

As described above, by forming the connecting member 52 to be able to be fastened and fixed to the wheel well inner portion 34 and the rear pillar 24, the connecting member 52 can be added later. In other words, the connecting member 52 can be mounted after disposing in-vehicle equipment such as a car speaker on the vehicle-width-direction outer side of the connecting member 52.

As described above, the gusset member 51 and the connecting member 52 have front end portions connected to the ridge portion 34c and back end portions connected to the rear pillar lower portion 24b and the rear pillar upper portion 24a, and the gusset member 51, the connecting member 52, and the rear pillar 24 form a triangular shape.

The wheel well inner portion 34 to which the gusset member 51 and the connecting member 52 are connected is a portion (in other words, the rear damper supporting portion 34d) to which the suspension damper 18 of the suspension damper 18 is connected, and hence can receive the up-down-direction load input to the wheel well inner portion 34 via the suspension damper 18 by the gusset member 51 and the connecting member 52 and distribute the up-down-direction load to the gusset member 51 and the connecting member 52.

The vehicle 1 formed as above includes: the pair of left and right wheel well inner portions 34 having damper tops to which the upper ends of the suspension dampers 18 are mounted; and the framework member that is disposed on the vehicle rear side of the wheel well inner portions 34 and forms the opening edge of the back door opening S1. The framework member of the back door opening S1 includes: the rear header 23 that extends in the vehicle width direction and forms the upper end edge of the back door opening S1; and the rear pillars 24 that extend from the rear header 23 to the vehicle lower side via the corner portions 25 of the back door opening S1. The vehicle 1 includes: the pair of left and right gusset members 51 that connect the rear-side portions of the wheel well inner portions 34 and the rear pillars 24 to each other; and the pair of left and right connecting members 52 that connect the rear-side portions of the wheel well inner portions 34 and the places near the corner portions 25 to each other. The gusset members 51 and the connecting members 52 are connected to each other at the places near the rear damper supporting portions 34d to which the upper ends of the suspension dampers 18 are mounted.

As a result, the connecting member 52, the gusset member 51, and the rear pillar 24 form a triangular shape, and hence the connecting member 52, the gusset member 51, and the rear pillar 24 can suppress the displacement of the wheel well inner portion 34 to which the up-down direction load is input from the road surface via the suspension damper 18. As a result, the distorted deformation of the corner portion 25 and the like of the back door opening S1 caused by the transmission of the input up-down direction load can be suppressed, and the distorted deformation of the back door opening S1 can be suppressed.

By a section at which the connecting member 52 and the gusset member 51 forming the triangular shape are coupled to each other, the rear damper supporting portion 34d is supported, and the rigidity of the rear damper supporting portion 34d can be improved. Therefore, the displacement of the rear damper supporting portion 34d caused by the up-down direction load input from the road surface via the suspension damper 18 can be further suppressed.

Therefore, a case where the displacement of the rear damper supporting portion 34d is transmitted to the rear side as a large displacement can be suppressed, and the distorted deformation of the corner portion 25 of the back door opening S1 can be suppressed. Therefore, the ride comfort and the steering stability of the occupant can be secured.

The connecting members 52 each include the flat surface portion 52a facing in the vehicle width direction from the end portion (front-side end portion) on the rear damper supporting portion 34d side fixed to the rear damper supporting portion 34d to the end portion (rear-side end portion) on the rear header 23 side fixed to the rear header 23. The flat surface portion 52a is fixed to one surface of the rear pillar 24 facing in the vehicle width direction and one surface of the rear-side portion of the wheel well inner portion 34 facing in the vehicle width direction, specifically, one surface of the gusset member 51 facing in the vehicle width direction. As a result, the rear-side portion of the wheel well inner portion 34 and the rear pillar 24 can be connected to each other in a state in which the connecting member 52 faces in the vehicle width direction without being twisted or curved.

The connecting member 52 that forms a triangular shape with the gusset member 51 and the rear pillar 24 can reliably transmit the up-down direction load input from the road surface via the suspension damper 18 as compressive force in the axial force direction and reliably suppress the displacement of the rear damper supporting portion 34d. The perpendicular line direction of the flat surface portion 52a matches with the vehicle width direction, and hence the rear damper supporting portion 34d can be supported by a thick-plate portion of the connecting member 52 of which rigidity is higher. Therefore, the displacement of the rear damper supporting portion 34d can be reliably suppressed.

The connecting members 52 each have the bead 52b that extends in the longitudinal direction provided thereon, and hence the rigidity of the connecting member 52 can be improved without increasing the mass of the connecting member 52. Therefore, the up-down direction load input from the road surface via the suspension damper 18 can be transmitted by the gusset member 51 and the connecting member 52 in a more reliable manner, and the distorted deformation of the corner portion 25 and the like of the back door opening S1 can be suppressed.

The connecting member 52 has a front end portion that is fastened to the gusset member 51 and a back end portion that is fastened to a place near the corner portion 25 by bolts, and hence the connecting member 52 can be mounted on the rear pillar 24 and the wheel well inner portion 34 (gusset member 51) later, and the connecting member 52 can be fixed to the rear pillar 24 and the gusset member 51 without hindering the operation of mounting equipment to be mounted on the outer side of the connecting member 52 in the vehicle width direction. There is no need to form a hole in the vehicle body in accordance with the fixing of the connecting member 52, and hence a water stop member does not necessarily need to be provided.

Regarding the correspondence between the configurations of the present disclosure and the abovementioned embodiment above, a vehicle suspension damper corresponds to the suspension damper 18. Similarly, a rear wheel well corresponds to the wheel well inner portion 34, a lift gate opening corresponds to the back door opening S1, a rear header corresponds to the rear header 23, a corner portion corresponds to the corner portion 25, a rear pillar corresponds to the rear pillar 24, a gusset member corresponds to the gusset member 51, a connecting member corresponds to the connecting member 52, a damper top corresponds to the rear damper supporting portion 34d, a flat surface portion corresponds to the flat surface portion 52a, and a bead corresponds to the bead 52b, but the present disclosure is not limited to the configurations of the abovementioned embodiment and many embodiments can be obtained.

For example, in this embodiment, a case where the vehicle width direction matches with the perpendicular line direction orthogonal to the flat surface portion 52a in the connecting member 52 is described, but the present disclosure is not limited thereto, and the connecting member 52 may be in a direction in which the flat surface portion 52a intersects with a direction perpendicular to the vehicle width direction at an angle less than 45 degrees.

The bead 52b is provided such that one bead 52b is provided in the longitudinal direction of the connecting member 52 from the vehicle front side toward the vehicle rear side, but a plurality of beads 52b may be disposed in the longitudinal direction of the connecting member 52 in a continuous manner, for example.

What is claimed is:

1. A rear vehicle-body structure of a vehicle, including: a pair of left and right rear wheel wells to which upper ends of suspension dampers are mounted; and a framework member that is disposed on a vehicle rear side of the rear wheel wells and forms an opening edge of a lift gate opening, the framework member including:
a rear header that extends in a vehicle width direction and forms an upper end edge of the lift gate opening; and
rear pillars that extend from the rear header to a vehicle lower side via corner portions positioned on an upper side of the lift gate opening, the rear vehicle-body structure comprising:
a pair of left and right gusset members that connect the rear wheel wells and the rear pillars to each other; and
a pair of left and right connecting members that connect the rear wheel wells and places near the corner portions to each other, wherein
the gusset members and the connecting members are connected to each other at places near damper tops to which the upper ends of the suspension dampers are mounted, and
wherein each of the pair of left and right connecting members has a flat plate structure and includes a flat surface portion formed by a flat surface facing in the vehicle width direction and a bead that protrudes along the vehicle-width-direction in a central portion of the flat surface portion and extends in the longitudinal direction in a fixed state.

2. The rear vehicle-body structure of the vehicle according to claim 1, wherein:
the connecting members each include a flat surface portion facing in the vehicle width direction from a damper-top-side end portion fixed to a respective one of the damper tops to a rear-side end portion fixed to a respective one of the rear pillars; and
the flat surface portion is fixed to one surface of the respective rear pillar facing in the vehicle width direction and one surface near the respective damper top.

3. The rear vehicle-body structure of the vehicle according to claim 2, wherein the connecting members each have a bead that extends in a longitudinal direction provided thereon.

4. The rear vehicle-body structure of the vehicle according to claim 3, wherein the connecting members are fastened to the gusset members and the places near the corner portions.

5. The rear vehicle-body structure of the vehicle according to claim 1, wherein the connecting members each have a bead that extends in a longitudinal direction provided thereon.

6. The rear vehicle-body structure of the vehicle according to claim 1, wherein the connecting members are fastened to the gusset members and the places near the corner portions.

7. The rear vehicle-body structure of the vehicle according to claim 2, wherein the connecting members are fastened to the gusset members and the places near the corner portions.

8. The rear vehicle-body structure of the vehicle according to claim 5, wherein the connecting members are fastened to the gusset members and the places near the corner portions.

9. A rear vehicle-body structure of a vehicle, including: a pair of left and right rear wheel wells to which upper ends of suspension dampers are mounted; and a framework member that is disposed on a vehicle rear side of the rear wheel wells and forms an opening edge of a lift gate opening,
the framework member including:
a rear header that extends in a vehicle width direction and forms an upper end edge of the lift gate opening; and
rear pillars that extend from the rear header to a vehicle lower side via corner portions positioned on an upper side of the lift gate opening,
the rear vehicle-body structure comprising:
a pair of left and right gusset members that connect the rear wheel wells and the rear pillars to each other; and
a pair of left and right connecting members that connect the rear wheel wells and places near the corner portions to each other, wherein
the gusset members and the connecting members are connected to each other at places near damper tops to which the upper ends of the suspension dampers are mounted, and
further comprising a cross member that connects front end lower portions of the pair of left and right rear wheel wells to each other in the vehicle width direction, the cross member having a pair of left and right side braces that extend onto the left and right rear wheel wells from both ends of the cross member, wherein
the pair of left and right rear wheel wells each comprises a rear damper supporting portion for mounting one of the suspension dampers; and
the pair of left and right connecting members each connects a vehicle rear side of a respective one of the rear damper supporting portions and an upper end of an upper portion of a respective one of the rear pillars to each other in the vehicle front-rear direction so as to be substantially parallel to a respective one of the side braces, and
wherein each of the pair of left and right connecting members has a flat plate structure and includes a flat surface portion formed by a flat surface facing in the vehicle width direction and a bead that protrudes along the vehicle-width-direction in a central portion of the flat surface portion and extends in the longitudinal direction in a fixed state.

10. The rear vehicle-body structure of the vehicle according to claim 1, wherein
a front-side portion of each of the connecting members is disposed on bolt holes of one of the gusset members which is fixed to one of the rear wheel wells and a lower portion of one of the rear pillars, such that fastening portions of the connecting member match with the bolt holes of the gusset member, and
each of the connecting members is disposed such that fastening portions on a rear-side portion of the connecting member match with a fastening portion provided on an upper portion of one of the rear pillars, and
each of the connecting members is fastened to the one of the wheel wells and the upper portion of the one of the rear pillars.

11. The rear vehicle-body structure of the vehicle according to claim 9, wherein
a front-side portion of each of the connecting members is disposed on bolt holes of one of the gusset members which is fixed to one of the rear wheel wells and a lower portion of one of the rear pillars, such that fastening portions of the connecting member match with the bolt holes of the gusset member, and
each of the connecting members is disposed such that fastening portions on a rear-side portion of the connecting member match with a fastening portion provided on the upper portion of one of the rear pillars, and
each of the connecting members is fastened to the one of the wheel wells and the upper portion of the one of the rear pillars.

* * * * *